9417X
C. Forbes.
Paper Mach.
No. Patented Feb. 20, 1836.
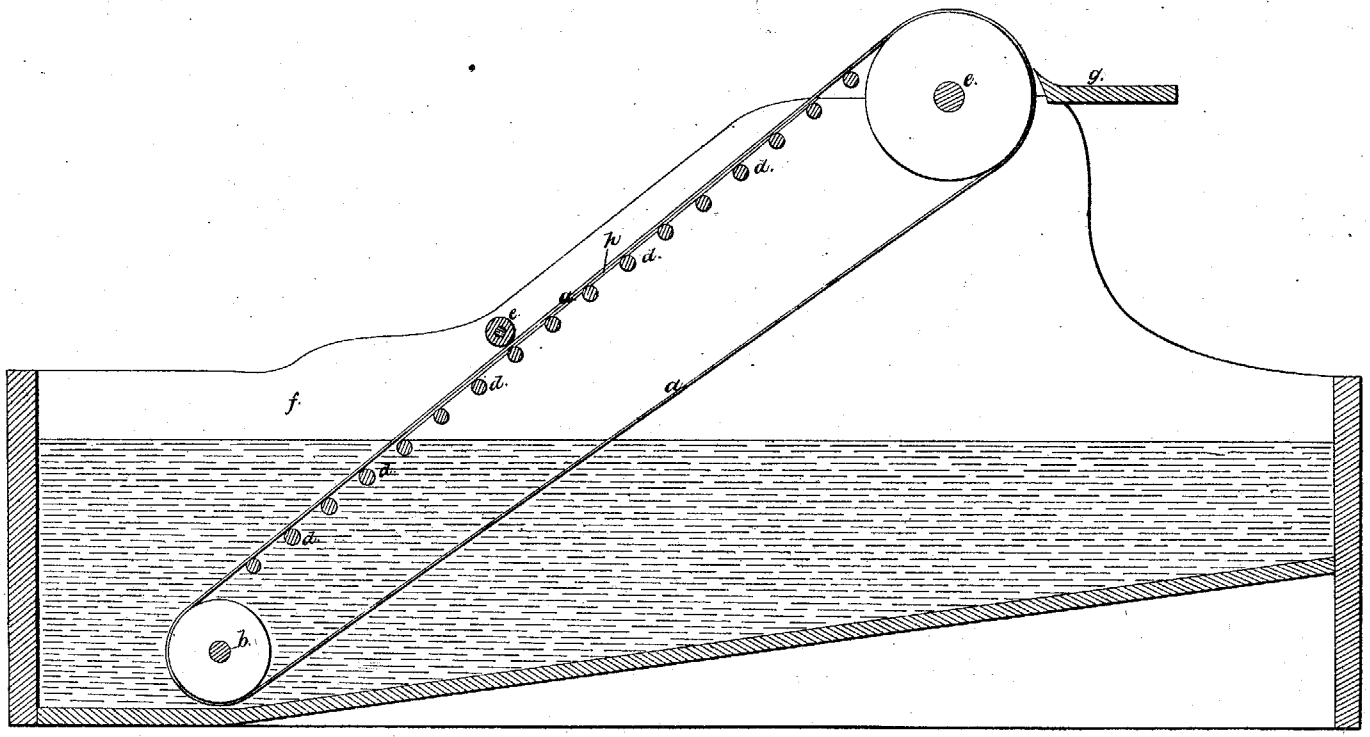
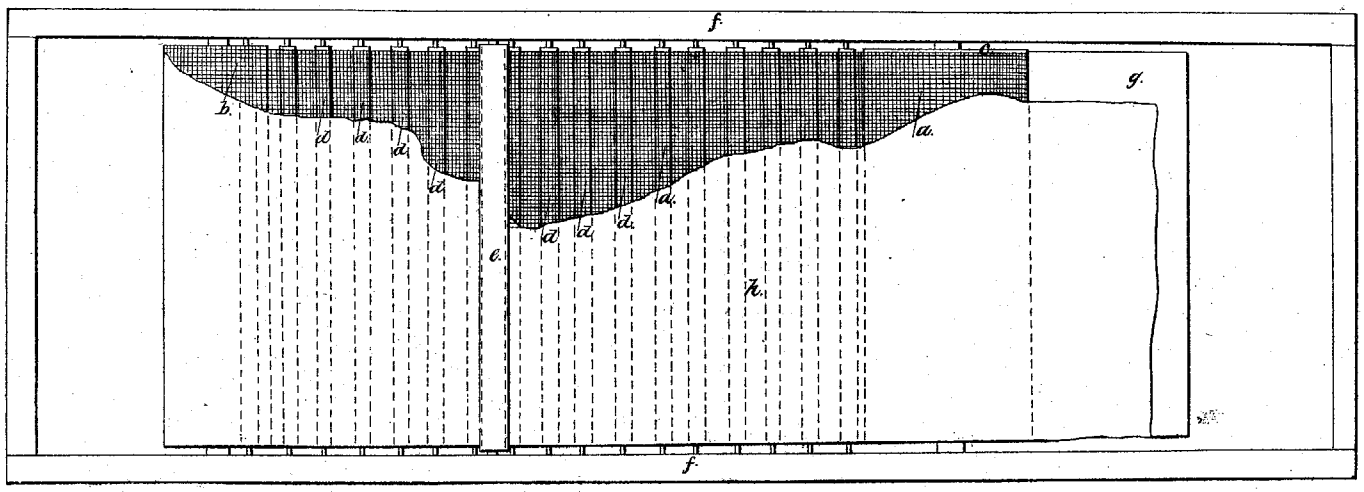

9417X

Charles Forbes. Feb 20, 1836

Letters Patent

The schedule referred to in these Letters Patent and making part of the same, containing a description in the words of the said Charles Forbes himself Administrator of Robert Rose dec'd of said Robert Rose's improvement in the machine for making paper.

---

To all to whom these presents shall come: Be it known that Robert Rose deceased late of Norwich, in the County of New London & State of Connecticut has invented a new and useful improvement in a machine for making paper, and that the following is a full and exact description thereof. The machine consists in part of a wire webb about fourteen feet long, passing over two large rollers the upper and larger being about twenty inches in diameter and the lower being about fourteen inches in diameter. the one being elevated above the other about forty degrees. Between the rollers are placed eighteen or twenty small rolls of wood or metal of about an inch or an inch and one quarter in diameter to support the upper part of the webb and sustain it so as to form a part of the bottom and the end of the vat containing the stuff or pulp. so that the motion caused by the passing of the water through the webb from the vat may leave sufficient pulp on the webb to form the paper. A small roller is placed just above the pulp over which the wire webb passes, and which by said roller is pressed against the couch before it <u>passes</u> between the couch and large upper roller where the paper leaves the wire webb and passes off on the felt over the couch.

What is claimed as the invention of said Robert Rose deceased is the sustaining the webb in a slanting position so as to form the end and in part the bottom of the vat containing the stuff or pulp so that the pulp by means of the water draining through the webb may be properly deposited on the webb for the formation of the paper —

Hartford March 31st 1835 —

Charles Forbes Adm'r

Witnesses

Wm W. Larabee

Erastus Smith

368 [illegible]